United States Patent
Zampetti

(10) Patent No.: US 9,698,926 B2
(45) Date of Patent: Jul. 4, 2017

(54) DISTRIBUTED TWO-STEP CLOCK

(71) Applicant: MICROSEMI FREQUENCY AND TIME CORPORATION, San Jose, CA (US)

(72) Inventor: George P. Zampetti, Livermore, CA (US)

(73) Assignee: MICROSEMI FREQUENCY AND TIME CORPORATION, San Jose, CA (US)

( * ) Notice: Subject to any disclaimer, the term of this patent is extended or adjusted under 35 U.S.C. 154(b) by 428 days.

(21) Appl. No.: 14/210,913

(22) Filed: Mar. 14, 2014

(65) Prior Publication Data
US 2014/0269672 A1    Sep. 18, 2014

Related U.S. Application Data

(60) Provisional application No. 61/789,957, filed on Mar. 15, 2013.

(51) Int. Cl.
*H04W 56/00* (2009.01)
*H04J 3/06* (2006.01)

(52) U.S. Cl.
CPC .......... *H04J 3/0667* (2013.01); *H04J 3/0673* (2013.01); *H04W 56/0015* (2013.01)

(58) Field of Classification Search
CPC .................................................. H04J 3/0673
See application file for complete search history.

(56) References Cited

U.S. PATENT DOCUMENTS

| | | | |
|---|---|---|---|
| 8,064,484 B2 | 11/2011 | Zampetti | |
| 8,385,212 B2 | 2/2013 | Zampetti et al. | |
| 8,427,963 B2 | 4/2013 | Zampetti et al. | |
| 8,594,134 B2 | 11/2013 | Zampetti et al. | |
| 8,644,348 B2 | 2/2014 | Zampetti | |
| 2008/0069150 A1* | 3/2008 | Badt | H04J 3/0667 370/503 |
| 2014/0075235 A1* | 3/2014 | Chandhoke | H04J 3/0667 713/401 |
| 2014/0177653 A1* | 6/2014 | Tzeng | H04J 3/0635 370/503 |

* cited by examiner

*Primary Examiner* — Ayaz Sheikh
*Assistant Examiner* — Sori Aga
(74) *Attorney, Agent, or Firm* — Patterson & Sheridan, LLP

(57) ABSTRACT

The present invention generally relates to methods and apparatus for precision time transfer wherein the inherent packet delay variation and possible asymmetry introduced in networks is avoided or mitigated. In one embodiment, the timing functions of a master device may be placed closer to a slave device using a Remote Time-Stamp Generator, located in the network between the master and the slave, and whose time reference serves as a proxy for the time reference of the master. Time-of-traversal of packets at the remote time-stamp generator may be used as proxies for the time-of-departure and the time-of-arrival of certain messages at the master. Such proxy times may be used to synchronize the slave with the master, particularly if the master and the Remote Time-Stamp Generator are both synchronized with a Global Navigation Satellite System (GNSS) source.

20 Claims, 6 Drawing Sheets

DISTRIBUTED TWO-STEP CLOCK

CROSS-REFERENCE TO RELATED APPLICATIONS

This application claims priority to U.S. provisional application having Ser. No. 61/789,957, filed on Mar. 15, 2013, which is hereby incorporated by reference in its entirety.

BACKGROUND OF THE INVENTION

Field of the Invention

Embodiments of the present invention relate generally to time and frequency alignment systems operating over packet-switched communications networks and, more specifically, to methods and apparatus for precision time transfer where the inherent packet delay variation and possible asymmetry introduced in networks is avoided or mitigated.

Description of the Related Art

It has been recognized that synchronizing network elements in communications networks to a high level of precision enables the provision of advanced services. In fact, time and frequency alignment is essential to certain types of systems. For example, accurate time alignment is required by cellular networks, services carried out in real time over a network, and network elements that use packet-based signal formats for multiplexing, transmission, and switching. Similarly, frequency alignment is required in time-division multiplexing (TDM) and media streaming systems that require fixed video or audio sample rates across multiple clients. Modern mobility services are demanding more and more bandwidth and lower and lower latency, placing increasing demands for tight time coordination in the wireless transport (radio access networks). Another example is the demand for much higher time coordination of transactions in high speed financial trading. To gain some perspective into the increasing demand on precision, whereas legacy time distribution targets at the more stringent end were on the order of sub-milliseconds, emerging application and services targets are now on the order of sub-microseconds.

The distribution of time over packet networks is now common in the industry. The dominant method is the use of the Network Timing Protocol (NTP) for support of general timing applications in general computing applications. However, these implementations, based on existing standards and conventions are only suitable for time alignments on the order of (several) milliseconds. Over the last decade, a new protocol, Precision Timing Protocol (PTP) has emerged supported by industry standards (IEEE 1588-2008, ITU-T Recommendations in the G.827x series). The key differentiator between NTP and PTP is that new levels of precision that can be obtained with PTP support the needs of a variety of new applications and services. Both PTP and NTP are protocols for exchanging time-stamps associated with time-of-arrival and time-of-departure of designated packets and are thus, in principle if not practice, capable of similar performance levels.

Packet-based network synchronization methods such as PTP and NTP transfer time and frequency references using packets containing time stamps that identify the times of departure/arrival of packets. These protocols can be used to distribute timing and frequency alignment throughout a network in a point-to-point fashion similar to the way that TDM networks distribute frequency alignment. For specificity the discussion here considers PTP though essentially identical statements apply in the case of NTP and all other packet-based time transfer methods.

A PTP "grandmaster", which is the root timing reference, can transfer time to a network element coupled to it, a "slave" instantiated on that network element can reconstitute the time, and then a "master" connected to the slave in the same network element can transfer time to a subsequent network element in this point-by-point fashion. A device that has both slave and master functions and which can be used to transfer time in a relay fashion is referred to as a "boundary clock." If every network element between the "grandmaster" and the end-point "slave" clock is a boundary clock, then packet delay variation (PDV) introduced by the network is moot since the timing flow is point-to-point. This architecture is referred to as "full on-path support" or "full protocol-level timing support" from the network. However, even where full on-path support is provided, the asymmetry in the connecting links remains as a dominant source of time transfer inaccuracy.

PTP can thus operate in a mode where the "slave" clock in a network element can communicate directly with the "master" clock system for timing purposes and that network element is referred to as a boundary clock, as described above (the same principle applies in NTP though the terminology is different). The case where the network does have intervening network elements that do not provide timing support between the end-point master (i.e., the last master in a chain, which could be the grandmaster in the case where a PTP-unaware network is between the grandmaster and the slave, or otherwise the last boundary clock between the grandmaster and the slave) and slave devices can be viewed as an architecture that provides "partial timing support" from the network. In all cases, the accuracy of two-way time-transfer protocols is adversely affected by asymmetry introduced by the communications network connecting the two network elements, including asymmetry in the physical medium, asymmetry in the construction of the forward and reverse paths in the network elements, and other sources. PTP and NTP assume that transit delays between master and slave clocks are symmetric, i.e., the transfer packet delay from a master clock to a slave clock is equal to the transfer packet delay from the slave clock to the master clock. But because forward and reverse physical paths are often different in coupled network elements, they are typically not symmetric. This is a source of asymmetry.

In all packet-based timing transfer methods, including PTP and NTP, there are two principal sources leading to synchronization error. One source of time error that cannot be corrected by the protocol is asymmetry, discussed above; the other is transit PDV. Asymmetry as considered here is the difference in transit delay of the designated event packets in the two directions between the communicating clocks. PDV, on the other hand, is an expected phenomenon in packet networks and contributes to asymmetry as well as to dynamic time alignment error. Whereas PDV is dependent on network loading, there is an underlying asymmetry component that is entirely independent of the network loading and depends, as previously noted, on the path between the clocks. The path, as considered here, includes all transmission links, including multiplexers and signal-format converters and transmission media, and intermediate network elements, such as switches and routers, between the communicating clocks. Clearly the impairments introduced by PDV and asymmetry generally increase with increasing number of network elements in the path as well as path geographical length.

Prior art teachings for methods to reduce the deleterious impact of PDV in packet networks include the use of boundary clocks and transparent clocks. However, such methods do not address the deleterious impact of asymmetry in the physical plant (i.e. cables and physical layer transmission). There is a need, therefore, for a system that addresses PDV and asymmetry.

SUMMARY OF INVENTION

Embodiments disclosed herein generally relate to methods and apparatus for precision time transfer where the inherent packet delay variation and possible asymmetry introduced in networks is avoided or mitigated.

In one aspect, a method is provided for synchronizing a clock at a slave device (slave) with a clock at a remote time stamp generator, where the slave and a master device (master) are connected over a network which includes the intermediate remote time-stamp generator. The method generally includes transmitting a first packet from the master to the slave so that the first packet traverses the remote time-stamp generator before reaching the slave and, at the remote time-stamp generator, generating a first time-stamp as the first packet traverses the remote time-stamp generator en route to the slave and communicating the first time-stamp to the master. The method further includes transmitting a second packet, which includes the first time-stamp, from the master to the slave. Further yet, the method includes transmitting a third packet from the slave to the master so that the third packet traverses the remote time-stamp generator before reaching the master and, at the remote time-stamp generator, generating a second time-stamp as the third packet traverses the remote time-stamp generator en route to the master and communicating the second time-stamp to the master. In addition, the method includes transmitting a fourth packet which includes the second time-stamp from the master to the slave, and synchronizing the clock at the slave with the clock at the remote time-stamp generator based on at least the first and second time-stamps, a time of arrival of the first packet at the slave, and a time of departure of the third packet from the slave.

In another aspect, a system including a master device (master) and a remote time-stamp generator is provided. The master is configured to transmit a first packet, a second packet, and a fourth packet over a network to a slave device (slave) and to receive a third packet over the network from the slave. The first packet and the third packet are transmitted so as to traverse a remote time-stamp generator before reaching the slave and the master, respectively. The remote time-stamp generator is positioned at a network location between the master and the slave and configured to perform operations. The operations include generating a first time-stamp as the first packet transmitted from the master to the slave traverses the remote time-stamp generator en route to the slave, and communicating the first time-stamp to the master, where the first time-stamp is then included in the second packet transmitted from the master to the slave. The operations further include generating a second time-stamp as the third packet transmitted from the slave to the master traverses the remote time-stamp generator en route to the master, and communicating the second time-stamp to the master, where the second time-stamp is then included in the fourth packet transmitted from the master to the slave.

In yet another aspect, a method is provided for transmitting packets between a master device (master) and a slave device (slave), with the slave and the master being connected over a network which includes an intermediate remote time-stamp generator. The method generally includes transmitting a first packet from the master to the slave so that the first packet traverses the remote time-stamp generator before reaching the slave, the first packet having an approximate time of departure of the first packet from the master. The method further includes, at the remote time-stamp generator, determining a time of departure of the first packet from the remote time-stamp generator as the first packet traverses the remote time-stamp generator en route to the slave and communicating the time of departure of the first packet to the master. In addition, the method includes transmitting a second packet from the master to the slave, the second packet having the time of departure of the first packet from the remote time-stamp generator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
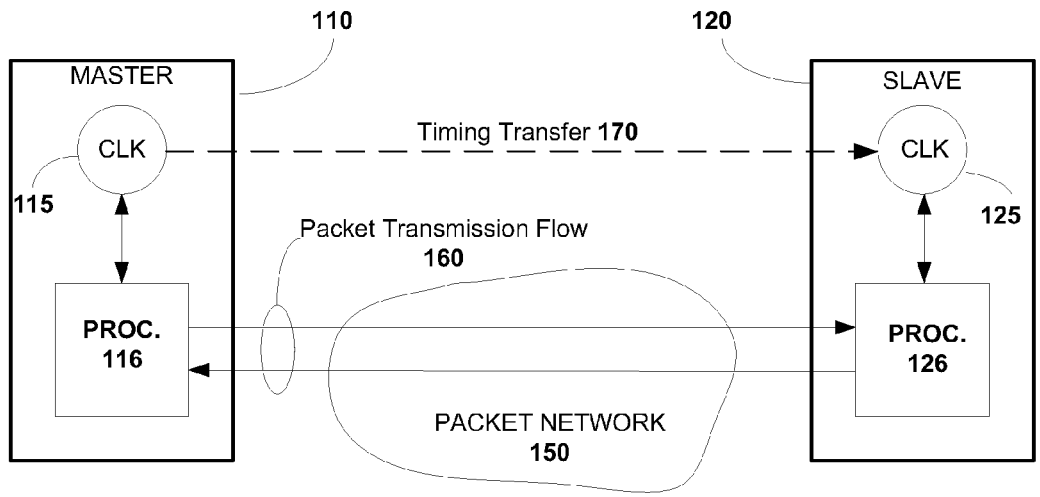
FIG. 1 depicts a conventional arrangement for aligning a slave clock to a master clock using packet-based methods.

Embodiments of the invention described here provide robustness and relative insensitivity to network packet delay variation (PDV) and network transit-delay asymmetry. By logically placing the timing critical functions of the master close to the slave, the PDV and transit-delay asymmetry introduced by the network can be defeated, as there is typically less noise added between closer network elements. Here, "closer" refers to less logical network distance in terms of the number of intervening switches and/or routers. In one embodiment, the timing functions of the master may be placed closer to the slave using a Remote Time-Stamp Generator, located in the network between the master and the slave, and whose time reference serves as a proxy for the time reference of the master. More specifically, time-of-traversal of packets (specifically, SYNC messages and DELAY_REQUEST messages in PTP) at the Remote Time-Stamp Generator may be used as proxies for the time-of-departure of SYNC messages from the master and the time-of-arrival of DELAY_REQUEST messages at the master. As discussed in greater detail below, such proxy times may be used to synchronize the slave with the master, particularly if the master and the Remote Time-Stamp Generator are both synchronized with a Global Navigation Satellite System (GNSS) source. Note, the reference time at the timing plane, in this case the Remote Time-Stamp Generator, must be accurate. On the other hand, the master no longer needs to have a very accurate time, as the timing plane is moved to the Remote Time-Stamp Generator.

The notion of a "PTP aware" path is one current proposed approach to reduce asymmetry effects. In a fully Precision Timing Protocol (PTP) aware path, there is the notion of on-path support mechanisms such as boundary clocks and transparent clocks at every switching or routing node. However, on-path support methods only address time-transfer errors introduced inside network elements and any asymmetry in the transmission medium, such as, for example, the fiber strands for the two directions of transmission, cannot be compensated for by on-path support mechanisms. Furthermore, in a real operational network, which may traverse different operational domains administered by different entities, full on-path support is a difficult challenge. The distributed two-step clock method described herein mitigates the network impairments in a network path without requiring on-path support mechanisms such as transparent clocks and boundary clocks. The distributed two-step method places just one function, the Remote Time-Stamp Generator between the master and slave, preferably as close to the slave as possible. Doing so compensates for and defeats impairments introduced in the packet network between master and the Remote Time-Stamp Generator. Specifically, moving the reference timing plane closer to the slave using the Remote Time-Stamp Generator defeats packet-delay-variation in the network (of the segment that is between the Remote Time-Stamp Generator and the master). Use of the Remote Time-Stamp Generator also defeats asymmetry in transit delay of that network segment. If the Remote Time-Stamp Generator is deployed at the edge of the network and connects directly to the slave, then the entire network PDV and asymmetry is defeated. In using the method described herein, the slave does not need to do anything different and thus this technique is interoperable with existing slaves.

Some innovative approaches to the transfer of timing over packet networks and methods to defeat packet delay variation are described in U.S. Pat. No. 8,385,212, entitled "Method and Apparatus for Finding Latency Floor in Packet Networks"; U.S. Pat. No. 8,427,963, entitled "Method and System for Analyzing and Qualifying Routes in Packet Networks"; U.S. Pat. No. 8,644,348, entitled "Method for Generating a Robust Timing Correction in Timing Transfer Systems"; and U.S. Pat. No. 8,064,484, entitled "Enhanced Clock Control in Packet Networks," which are hereby incorporated by reference in their entireties. Approaches to defeat transmission asymmetry are described in U.S. Pat. No. 8,594,134, entitled "Precision Time Transfer over Optical Fiber" and U.S. application Ser. No. 14/149,370, entitled "Universal Asymmetry Correction for Packet Timing Protocols" and filed on Jan. 7, 2014, which are hereby incorporated by reference in their entireties.

FIG. 1 depicts a conventional connection between a master 110 ("server") and a slave 120 ("client") in a network 150. As depicted in FIG. 1, the master 110 can achieve timing transfer 170 from its own master clock 115 to a slave clock 125 inside the slave 120 by exchanging packets with time-stamps contained in a packet transmission flow 160 between processing elements 116 (master) and 126 (slave) over a packet network 150.

The goal of packet-based methods is to establish the "offset from master" (OFM) of the slave. That is, if we denote the master time by $T_M$ and the slave time by $T_S$, then the goal is to establish $\epsilon$ where $T_S = T_M + \epsilon$.

Figure 2:
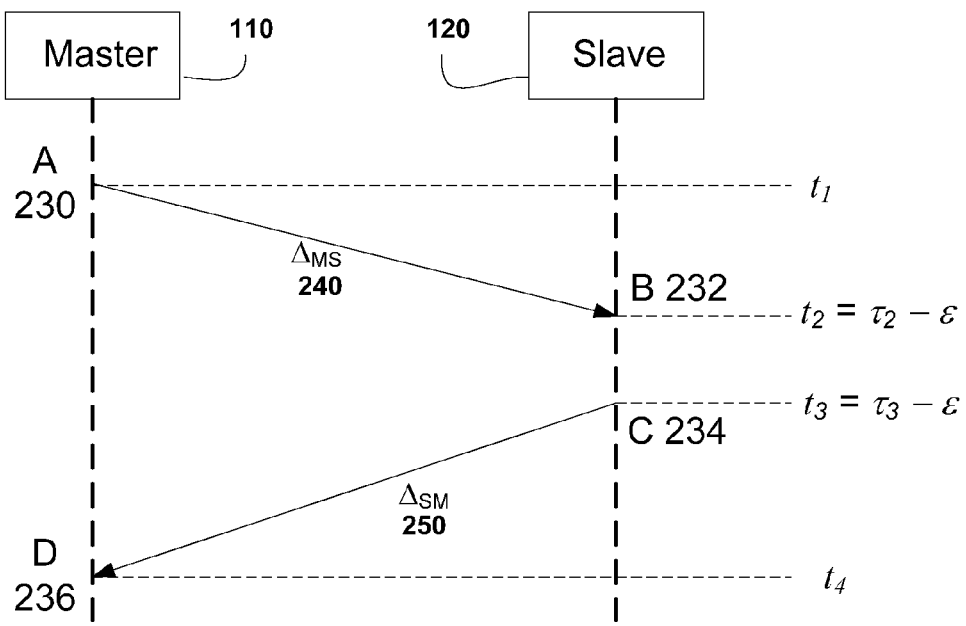
FIG. 2 provides an event diagram illustrating the time-stamps associated with the times of departure and times of arrival of packets constituting the two-way timing signal as the packets are transferred between master and slave.

The premise of time-stamped packet exchange as used in PTP (and Network Timing Protocol (NTP) as well) is illustrated in FIG. 2. Traditional packet-based two-way time transfer methods follow the event diagram shown in FIG. 2. The terminology used here is that from PTP but the same principles apply to other methods and protocols. Referring to FIG. 2, the sequence of events and important items of information associated with an exchange of packets between master 110 and slave 120 are (the terminology commonly used with PTP is also provided below):

Event A 230: A "SYNC" packet is transmitted by master 110 and time-of-departure of the SYNC packet is $t_1$. This time-of-departure from the master 110 of the SYNC packet is referred to as T1. Here, "referred to" means the time-of-departure time-stamp is being given the name T1, while the value of the time-of-departure time-stamp is $t_1$.

Event B 232: SYNC packet arrives at slave 120, which measures the time-of-arrival as $\tau_2$; assuming that the slave time offset from master is $\epsilon$, the actual time-of-arrival with respect to the master timescale is $t_2 = \tau_2 - \epsilon$. The time-of-arrival time-stamp of the SYNC message at the slave 120 is referred to as T2.

Event C 234: A "DELAY_REQUEST" packet is transmitted by slave 120 that notes the time-of-departure is $\tau_3$; assuming that the slave time offset from master is $\epsilon$, the actual time-of-departure with respect to the master timescale is $t_3 = \tau_3 - \epsilon$. This time-of-departure time-stamp from the slave 120 of the DELAY_REQUEST packet is referred to as T3.

Event D 236: DELAY_REQUEST packet arrives at master 110, which measures time-of-arrival as $t_4$. The time-of-arrival time-stamp of the DELAY_REQUEST message at the master 110 is referred to as T4.

Such a two-way exchange of packets can provide four time-stamps related to time-of-arrival and time-of-departure, namely the quartet (T1, T2, T3, T4). However, it should be noted that the message rate for SYNC and DELAY_REQUEST packets can be different and some digital signal processing is implied to construct time-stamp sequences that are aligned in rate and sampling grid. This information is suitable for allowing the slave 120 to align in time with the master 110 (assuming that the slave has knowledge of all the time-stamps).

For simplicity of explanation, we assume that the rates are equal and the packet exchanges can be organized appropriately in individual two-way exchanges. Thus there are four measured values (representing T1, T2, T3, and T4) that can be communicated between the master 110 and slave 120, namely, ($t_1$, $\tau_2$, $\tau_3$, $t_4$). Denoting by $\Delta_{MS}$ and $\Delta_{SM}$ the respective transit delays between the Master and Slave and vice versa, the following equations can be established:

$t_4 = \tau_3 - \epsilon + \Delta_{SM}$ (from an S-to-M packet)

$t_1 = \tau_2 - \epsilon - \Delta_{MS}$ (from a M-to-S packet)  (Eq. 1)

The estimate of forward (master-to-slave) transit delay, $\Delta_F$, is given by:

$$\Delta_F = \tau_2 - t_1 \quad \text{(Eq. 2)}$$

and the estimate of reverse (slave-to-master) transit delay, $\Delta_R$, is given by:

$$\Delta_R = t_4 - \tau_3 \quad \text{(Eq. 3)}$$

Note that these estimate include an "error" that is related to the offset from master (OFM) (=e) of the slave clock.

The round-trip delay, RTD, is estimated simply as:

$$RTD = (t_4 - \tau_3) + (\tau_2 - t_1) \quad \text{(Eq. 4)}$$

The two quantities in parentheses in the right-hand side of (Eq. 4) comprise the reverse and forward offset measurements, respectively.

Note that there are two equations with three unknowns ($\epsilon$, $\Delta_{MS}$, $\Delta_{SM}$) so it is common in conventional PTP methods to assume reciprocity of transit delay between the two devices, i.e. $\Delta_{MS} = \Delta_{SM}$, thereby reducing the number of unknowns to 2 and therefore computing $\epsilon$, the slave time offset from master. A consequence of this assumption is that there could be an error in the time transfer that is related to the asymmetry of the transit delay in the forward (master-to-slave) and reverse (slave-to-master) directions. Specifically, the error in time transfer will have an error that is nominally $$\varepsilon_A = \frac{\Delta_{MS} - \Delta_{SM}}{2} \quad \text{(Eq. 5)}$$

The asymmetry in transit delay of timing packets between slave 110 and master 120 provides a statistical bound to the accuracy of time transfer that can be guaranteed. Packet-based methods like PTP and NTP use separate fiber strands or fiber wavelengths for carrying the signal in the two directions (S-to-M and M-to-S). This is in addition to asymmetry that may result from the behavior of intervening network elements.

In addition to asymmetry and network induced packet delay variation, time-stamp error is an important issue that needs to be addressed. Of the four time-stamps T1, T2, T3, T4, one of them, T1, is special. Specifically, the SYNC message is supposed to contain the time-stamp T1 that pertains to itself. The other three time-stamps are struck when packets traverse the physical layer medium, but there is no requirement to insert the time-stamp into the packet which is being time-stamped.

As discussed, proposed methods based on time-transfer protocols such as NTP and PTP are impaired by network-induced PDV and transit-delay asymmetry. In some cases, the impairment is related to the equipment's ability to strike precise time-stamps and any time-stamp error is additive, and possibly indistinguishable, from network induced PDV.

The 1588 Timing Protocol, also known as the Precision Timing Protocol, describes a two-step method to correct for delay variation associated with delay variability from the point in the application space where a SYNC Message time-stamp is first assigned and the Physical point where it egresses the equipment; this point is the reference point where the time-stamp must be struck. The precision time-stamp point is ideally embedded in the physical layer of the device or in the stack as close to the physical layer as possible.

At the instant a SYNC packet from the PTP application space traverses the time-stamp point, a precise timestamp of this event is struck. The term T1 is used for this time-stamp. This precise timestamp is then fed back to the PTP application software which embeds this precise timestamp in a FOLLOW-UP packet. That is, the SYNC message contains an approximate value for T1 whereas the FOLLOW-UP message contains the precise (accurate) value for T1. In the PTP protocol, it suffices that the approximate time-stamp be within 1 second of the precise value, and one approach for achieving this is to obtain the approximate time-stamp when the packet is created. A more accurate approximate time-stamp may be obtained by estimating the time delay through the network protocol stack and adding the time delay to the time when the packet is created. A receiving slave PTP clock utilizes the follow-up time-stamp (precise value for T1) as input to the mechanism to estimate time difference measurements between the master clock and slave clock. The architecture where the precise value for T1 is provided in a FOLLOW_UP message is termed "two-step"; for reference, the architecture where the precise value for T1 is transmitted in the SYNC message itself is termed "one-step".

Whereas the two-step follow-up mechanism addresses the delay variation associated with sourcing system, specifically delay variation produced by the protocol stack processing in the master network element 110, it does not address transit delay variations associated with the transport of the SYNC packet between the peering PHY layers of the master and slave PTP devices 120. Embodiments of the distributed two-step clock discussed herein addresses this potentially significant source of delay variation by the use of distributed time-stamp points and associated mechanisms to effectively physically separate the precision time-stamp point from the master 110. Using this technique, a standard PTP slave device will operate without any changes at a higher level of precision even when PTP services are delivered over highly delay variable transport environments.

Figure 3:
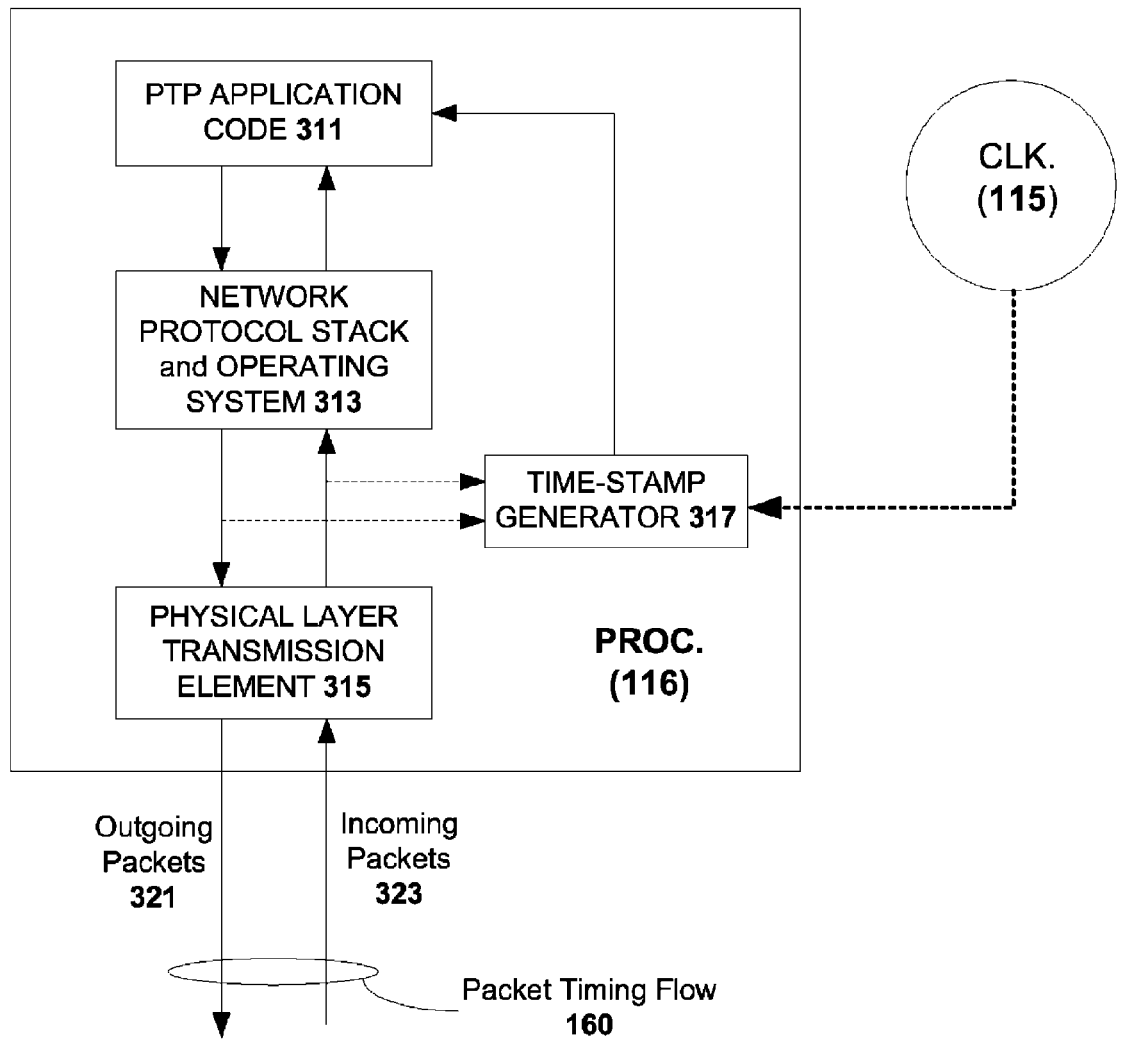
FIG. 3 depicts actions in a packet-based clock for generating time-stamps.

Referring now to FIG. 3, the time-stamp T1 reflects the time value of the master clock 115 as a particular bit, early in the SYNC packet, egresses the master clock 115 as observed at the physical layer (essentially the Physical Layer Transmission 'Element 315). Since the timing event occurs in the early part of the SYNC packet, it is possible to strike the time-stamp and insert it in a later part of the SYNC packet and also compute the Frame Check Sequence (FCS) that is placed in the end of the packet. This is referred to as "one-step operation". The two-step architecture is also part of the PTP Standard and all conforming slave devices 120 must operate with two-step as well as one-step master devices 110.

Figure 4:
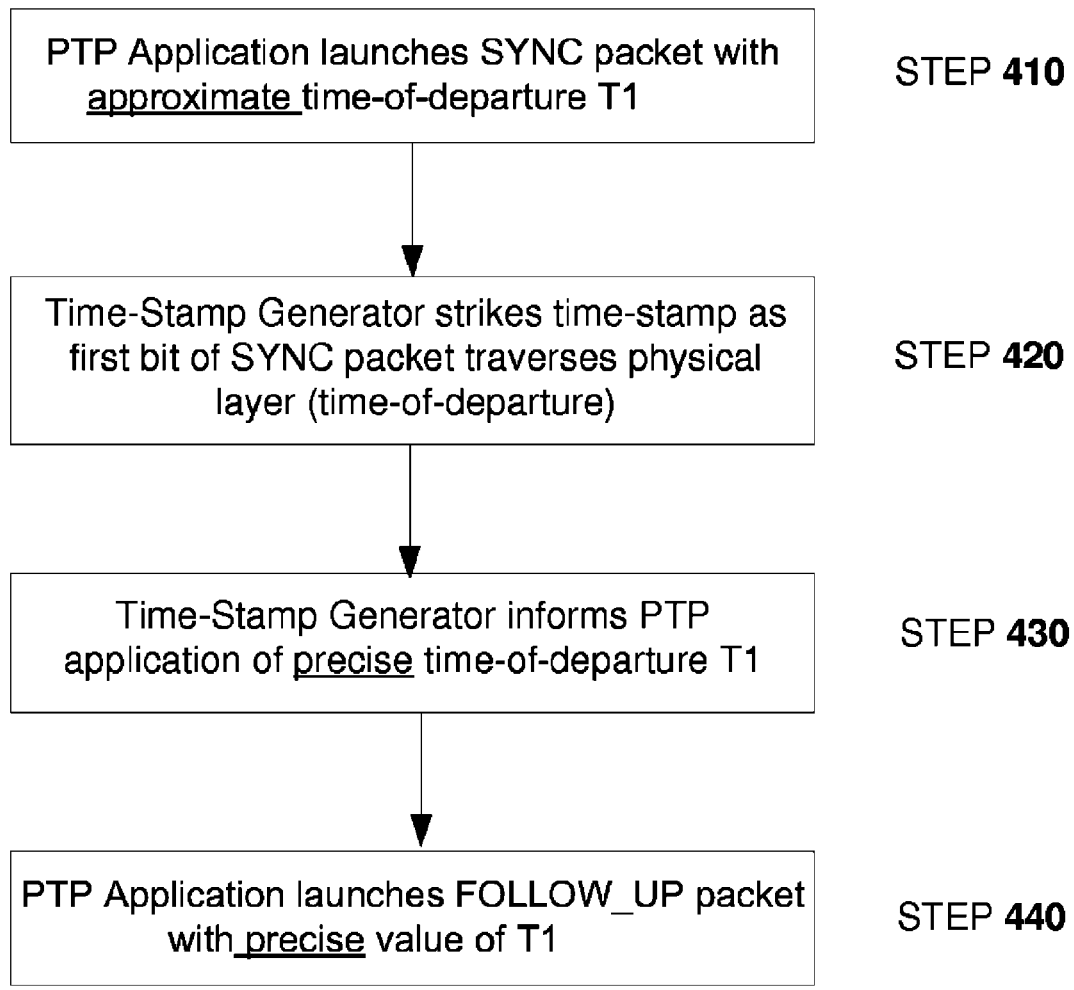
FIG. 4 depicts steps employed in a master clock for implementing the conventional two-step method.

The basic functional blocks in a PTP clock function are depicted in FIG. 3 and are similar for both master 110 and slave devices 120. FIG. 3 as shown is particularly applicable to the master device 110. The sequence of events involved with the transmission of a SYNC message is explained with reference to the flow chart in FIG. 4 and the elements depicted in FIG. 3.

The PTP Application code 311 creates and launches a SYNC message as shown in Step 410. The SYNC packet has a field for the time-of-departure time stamp T1. The value 401 placed in this field by the Application Code is approximate. As discussed, the approximate value 401 may be obtain from the time-stamp generator 317 when the packet is created, and a more accurate approximate time-stamp may be obtained by estimating the time delay through the network protocol stack 313 and adding this time delay to the time when the packet is created. The SYNC packet is processed through the network protocol stack and operating system 313 and eventually delivered to the physical layer transmission element 315. The passage of the first bit of the SYNC packet triggers Step 420 where the time-stamp generator 317 reads the master clock 115 to establish the true value of the time-of-departure $t_1$. At Step 420, the time-stamp for the true time-of-departure T1 is struck when the designated event (the first bit of the SYNC packet) traverses the connection between the MAC (bottom of protocol stack) and the PHY. That is, the delay through the PHY is calibrated and accounted for, and the protocol may designate the event to be when the first bit emerges from the PHY onto the actual transmission medium (e.g., copper wire or optical fiber). The SYNC packet is launched into the network as an outgoing packet within the packet timing flow 160 and contains the approximate value time-stamp T1. In Step 430 the Time-Stamp Generator 317 informs the PTP Application code 311 of the true value $t_1$ of the time-of-departure by providing it with the true value time-stamp T1. In Step 440 the PTP Application launches the FOLLOW-UP packet that provides the true value T1 of the time-of-departure of the SYNC packet. The two-step mechanism thus enables the delivery of a precise true value T1 to the slave.

Figure 5:
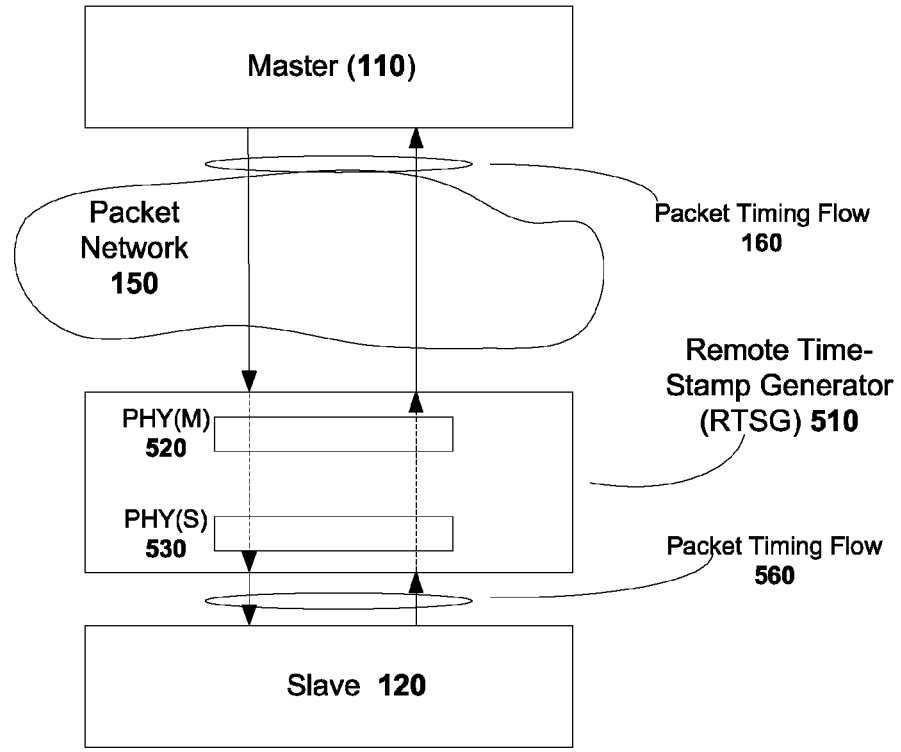
FIG. 5 depicts an arrangement for deploying a Remote Time-Stamp Generator for implementing a distributed two-step clock, according to an embodiment.
Figure 6:
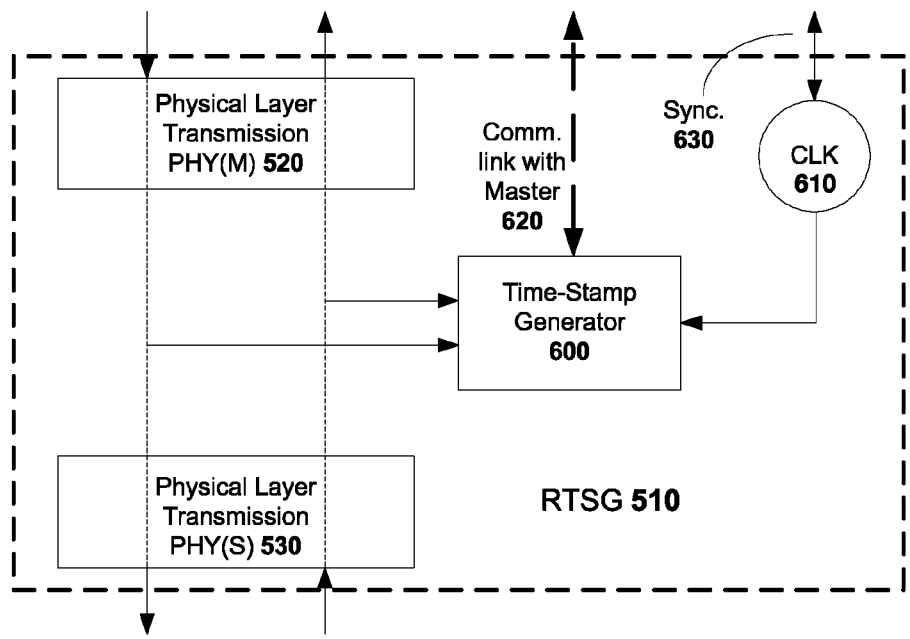
FIG. 6 provides a block diagram of an embodiment of the Remote Time-Stamp Generator. The same hardware units can be used to implement multi-port packet-based network elements.

FIG. 5 depicts the arrangement for deploying a Remote Time-Stamp Generator (RTSG) 510 for implementing a distributed two-step clock, according to an embodiment. The components in the distributed two-step method are shown in FIG. 5 and FIG. 6 depicts the functional elements of the RTSG 510 relevant to the two-step clock. As set forth herein, the RTSG 510 is essentially a multi-port device with one port directed towards the master 110 and the other port directed towards the slave 120. The key element of the RTSG 510 is the ability to identify and time-stamp PTP messages traversing between the master 110 and the slave 120 at the physical layer transmission block PHY(S) 530. With reference to FIG. 5, SYNC messages emanating from the master 110 towards the slave 120 traverse the packet network 150 between the master 110 and the RTSG 510. The RTSG 510 delivers the PTP packets to the slave 120 through the port on the slave 120 side, and, as the packets cross the physical layer PHY(S) 530, the RTSG 510 strikes time-stamps (only the SYNC type of packets need to be time-stamped) as the packets progress towards the slave 120 from the RTSG 510. Similarly, packets from the slave 120 to the master 110 enter the RTSG 510 from the slave 120 side and are time-stamped at PHY(S) 530; primarily the DELAY_REQUEST type of packets discussed above need to be time-stamped.

FIG. 6 provides a block diagram of an embodiment of the RTSG 510. The same hardware units can be used to implement multi-port packet-based network elements. As shown, the RTSG 510 includes a time stamp generator 600 that is used to generate the data for the time stamp based on timing information received from clock 610. The RTSG 510 also includes a communication link 620 that is connected to the master 110. The RTSG 510 further includes a synchronization link 630 for use in synchronizing an RTSG clock 610 with an outside source, such as a Global Navigation Satellite System (GNSS). The RTSG 510 is configured to identify and time-stamp PTP messages traversing between the master 110 and the slave 120 at the physical layer transmission block PHY(S) 530 or the physical layer transmission block PHY(M) 520.

Note, the RTSG 510 may be simpler than the master 110. For example, PTP master devices typically perform a number of administrative functions such as announcing themselves, and setting up items of the communication protocol (e.g., setting up the communication as unicast or multicast), without limitation. In one embodiment, the RTSG 510 may not perform such functions. That is, RTSG 510 serves as a proxy for the time reference of the master 110, but does not perform other functions, including various administrative functions, that the master 110 performs.

Figure 7:
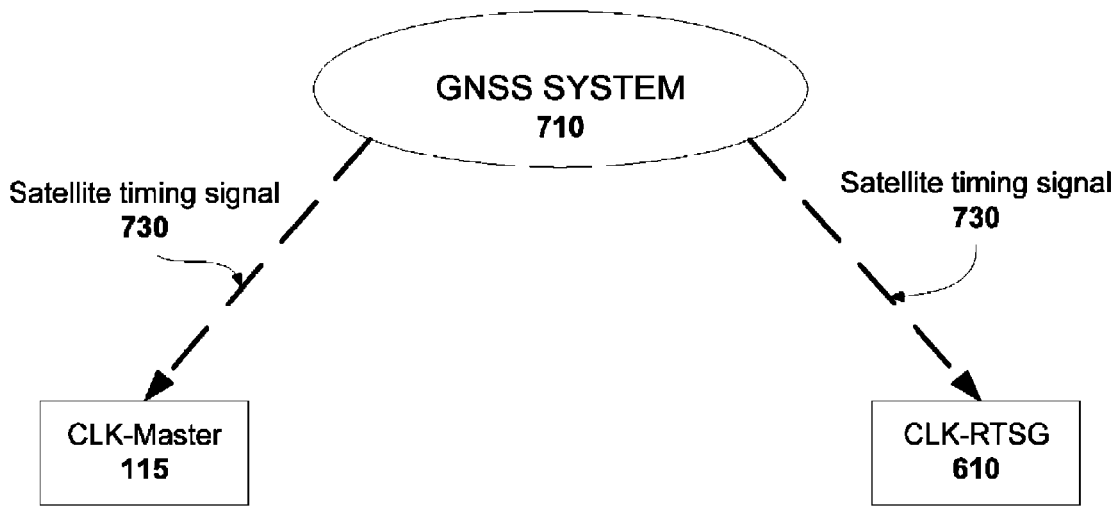
FIG. 7 depicts synchronization of clocks using a common source such as a Global Navigation Satellite System (GNSS), according to an embodiment.

FIG. 7 depicts the synchronization of clocks using a common source such as a Global Navigation Satellite System (GNSS), according to an embodiment. The RTSG clock 610 may be synchronized to the master clock 115. This can be achieved, for example, by the scheme depicted in FIG. 7 wherein the RTSG clock 610 and the master clock 115 are each synchronized to a common source such as a GNSS system 710 exemplified by GPS. It is optional that the master clock 115 and RTSG clock 610 are synchronized. The slave 120 is tracking the RTSG clock 610 which can serve as a proxy for master clock 115. If the master clock 115 and RTSG clock 610 are synchronized, then the time-stamps generated by the RTSG 510 are equivalent to those that the master 110 would generate if deployed at the RTSG location. If the master clock 115 and RSTG clock 610 are not synchronized, then the time-stamps generated by the RTSG 510 are used in lieu of, but not equivalent to, those that the master 110 would generate if deployed at the RTSG location.

Figure 8:
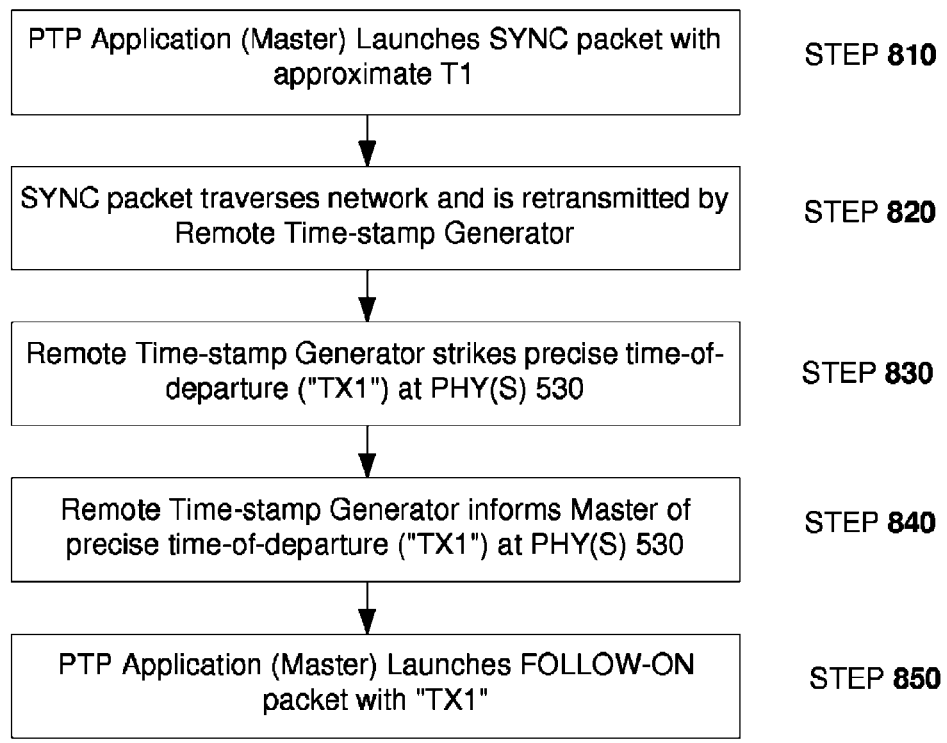
FIG. 8 provides a flow diagram of processes in the distributed two-step clock for the SYNC message, according to an embodiment.

FIG. 8 provides a flow diagram of steps of the processes in the distributed two-step clock for the SYNC message utilizing the arrangement of FIG. 5. Specifically, consider the delivery of the SYNC packet from the master 110 to the slave 120. At Step 810 the master 110 launches the SYNC packet with an approximate value (401) of T1. The SYNC packet traverses the packet network 150 and is retransmitted by the RTSG 510 at Step 820. In one embodiment, the RTSG 510 may be placed judiciously in the network so that the SYNC packet traverses the RTSG 510 on its way to the slave 120. For example, RTSG's may be placed at boundaries between two network operators or at boundaries between management domains of the same network operator. In an alternative embodiment, routing tables may be adjusted so that, e.g., PTP packets are routed through the RTSG 510. The SYNC packet itself includes the addresses of the master 110 and the slave 120, so the RTSG 510 knows to whom (i.e., the master 110) to send time-stamps it strikes and to whom (i.e., the slave 120) the SYNC packet is retransmitted.

At Step 830, the RTSG 510 strikes the time-stamp TX1 representing the precise time-of-departure of the above mentioned SYNC packet as it crosses the physical layer element PHY(S) 530 of the RTSG 510. At Step 840, the RTSG 510 provides the precise value TX1 to the master 110 via communication link 620. At Step 850, the master 110 launches the FOLLOW_ON packet containing the precise value TX1 received from the RTSG 510.

Figure 9:
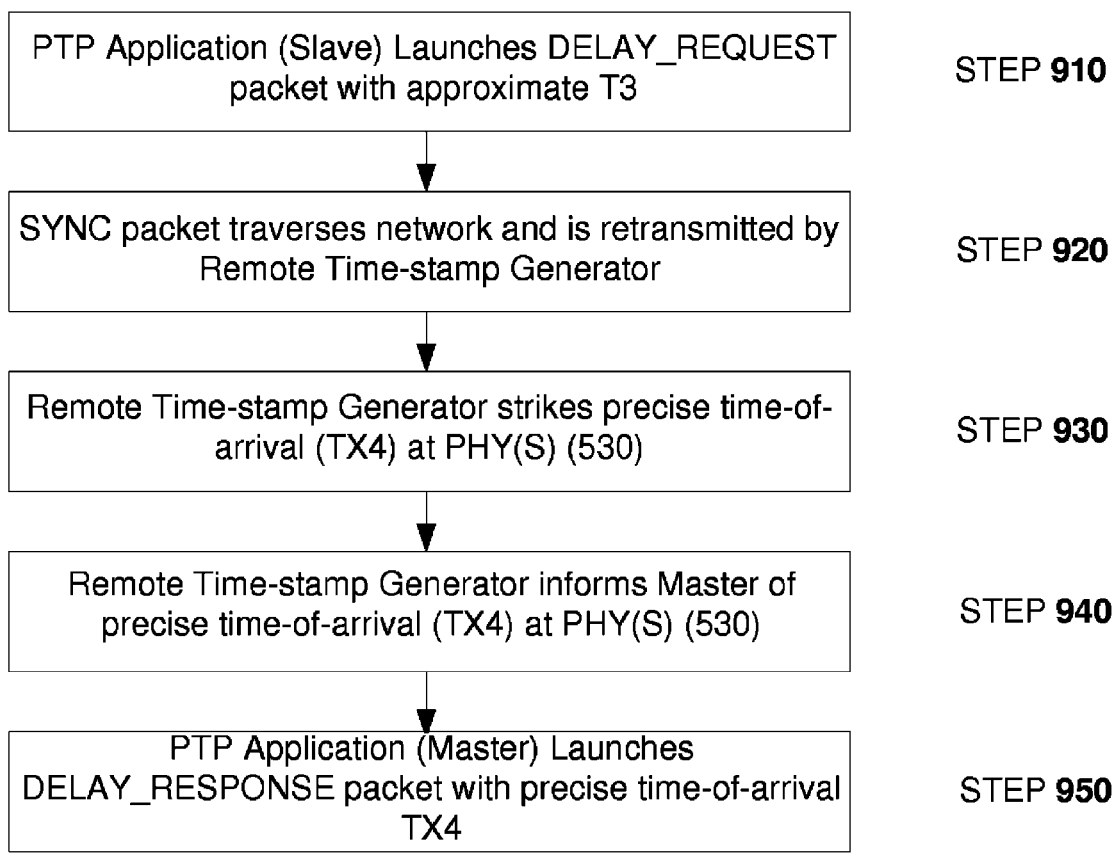
FIG. 9 provides a flow diagram of processes in the distributed two-step clock for the DELAY_REQUEST message, according to an embodiment.

FIG. 9 provides a flow chart depicting the key steps involved in a distributed two-step clock for handling the DELAY_REQUEST message from the slave 120 to the master 110. At Step 910, the slave 120 launches the DELAY_ REQUEST packet with an approximate value of T3 (this estimated value is ultimately not utilized by the master, but is noted for consistency with prior art slave 120 operation). The DELAY_REQUEST packet is received by the RTSG 510 and retransmitted by the RTSG 510 towards the master 110 at Step 920. Similar to the discussion above, the RTSG 510 may be placed judiciously in the network so that the DELAY_REQUEST packet traverses the RTSG 510 on its way to the master 110. Alternatively, routing tables may be adjusted so that, e.g., PTP packets are routed through the RTSG 510.

At Step 930, the RTSG 510 strikes a time-stamp TX4 representing the precise time-of-arrival of the above mentioned DELAY_REQUEST packet as it crosses the physical layer element PHY(S) 530, the precise time-of-arrival determined by clock 610 and the time-stamp TX4 generated by time stamp generator 600. At Step 940, the RTSG 510 provides the precise value TX4 to the master 110 via communication link 620. At Step 950, the master 110 launches the DELAY_RESPONSE packet containing the precise value TX4. This packet traverses the network all the way to the slave 120.

Embodiments of the present invention provide methods whereby the time reference of the RTSG 510 serves as a proxy for the time reference of the master 110. Moving the reference timing plane closer to the slave 120 using the RTSG 510 defeats packet-delay-variation in the network (of the segment that is between the RTSG 510 and the master 110). Moving the reference timing also defeats asymmetry in transit delay of the segment that is between the RTSG 510 and the master 110. It is noted that prior art considers the use of boundary clocks and transparent clocks for defeating network PDV. As set forth herein, the distributed two-step clock is a simpler, more effective approach in defeating network PDV. Further, the use of boundary clocks and transparent clocks in the prior art may be used to address a single network element while the distributed two-step clock accounts for a collection thereof, namely a network of network elements. In addition, the distributed two-step clock can be deployed even if the network contains PTP-unaware network elements, as network elements in the segment that is between the RTSG 510 and the master 110 do not need to be able to modify, or even be able to identify, PTP packets that pass through them. This is in contrast to prior art methods which are most suitable if all network elements in the network are PTP-aware (either all transparent clocks or all boundary clocks). In the case where some network elements are not PTP-aware and a few are boundary clocks, the boundary clocks require expensive oscillators to defeat the PDV induced by the PTP-unaware network elements.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. A method of synchronizing a clock at a slave device (slave) with a clock at a remote time-stamp generator, the slave and a master device (master) being connected over a network which includes the remote time-stamp generator placed intermediate the master and the slave, and the remote time-stamp generator being a device distinct from the master and the slave, the method comprising:

transmitting a first packet from the master to the slave so that the first packet traverses the remote time-stamp generator before reaching the slave;

generating, by the remote time-stamp generator, a first time-stamp as the first packet traverses the remote time-stamp generator en route to the slave, wherein the first time-stamp is communicated by the remote time-stamp generator to the master;

transmitting a second packet, which includes the communicated first time-stamp, from the master to the slave;

transmitting a third packet from the slave to the master so that the third packet traverses the remote time-stamp generator before reaching the master;

generating, by the remote time-stamp generator, a second time-stamp as the third packet traverses the remote time-stamp generator en route to the master, wherein the second time-stamp is communicated by the remote time-stamp generator to the master;

transmitting a fourth packet which includes the communicated second time-stamp from the master to the slave; and synchronizing the clock at the slave with the clock at the remote time-stamp generator based on at least the first and second time-stamps, a time of arrival of the first packet at the slave, and a time of departure of the third packet from the slave.

2. The method of claim 1,
wherein the communicated first time-stamp indicates a time-of-departure of the first packet at a physical layer of the remote time-stamp generator, and
wherein the communicated second time-stamp indicates a time-of-arrival of the third packet at the physical layer of the remote time-stamp generator.

3. The method of claim 1, further comprising, synchronizing a clock at the master and the clock at the remote time-stamp generator with a Global Navigation Satellite System (GNSS) source.

4. The method of claim 1, wherein the remote time-stamp generator is a device which includes a port for the master, a port for the slave, and a synchronization link for synchronizing the clock at the remote time-stamp generator with a GNSS source.

5. The method of claim 4, wherein the remote time-stamp generator is positioned between the master and the slave in the network.

6. The method of claim 5, wherein a logical network distance between the remote time-stamp generator and the slave is less than a logical network distance between the master and the slave.

7. The method of claim 1,
wherein the first packet is a Precision Time Protocol (PTP) SYNC packet,
wherein the second packet is a PTP FOLLOW-UP packet,
wherein the third packet is a PTP DELAY_REQUEST packet, and
wherein the fourth packet is a PTP DELAY_RESPONSE packet.

8. The method of claim 7, wherein the network includes PTP-unaware network elements.

9. A system, comprising:
a master device (master) configured to transmit a first packet, a second packet, and a fourth packet over a network to a slave device (slave) and to receive a third packet over the network from the slave, wherein the first packet and the third packet are transmitted so as to traverse a remote time-stamp generator before reaching the slave and the master, respectively, wherein:

the remote time-stamp generator is positioned at a network location between the master and the slave, the remote time-stamp generator is a device distinct from the master and the slave, and the remote time stamp generator is configured to:
generate a first time-stamp as the first packet transmitted from the master to the slave traverses the remote time-stamp generator en route to the slave,
communicate the first time-stamp to the master,
generate a second time-stamp as the third packet transmitted from the slave to the master traverses the remote time-stamp generator en route to the master, and
communicate the second time-stamp to the master; and
the master is further configured to:
include the communicated first time-stamp in the second packet transmitted from the master to the slave, and
include the communicated second time-stamp in the fourth packet transmitted from the master to the slave.

10. The system of claim 9,
wherein the first time-stamp indicates a time-of-departure of the first packet at a physical layer of the remote time-stamp generator, and
wherein the second time-stamp indicates a time-of-arrival of the third packet at the physical layer of the remote time-stamp generator.

11. The system of claim 9, wherein a clock at the master and a clock at the remote time-stamp generator are synchronized with a Global Navigation Satellite System (GNSS) source.

12. The system of claim 9, wherein the remote time-stamp generator includes a port for the master, a port for the slave, and a synchronization link for synchronizing a clock at the remote time-stamp generator with a GNSS source.

13. The system of claim 9, wherein a logical network distance between the remote time-stamp generator and the slave is less than a logical network distance between the master and the slave.

14. The system of claim 9,
wherein the first packet is a Precision Time Protocol (PTP) SYNC packet,
wherein the second packet is a PTP FOLLOW-UP packet,
wherein the third packet is a PTP DELAY_REQUEST packet, and
wherein the fourth packet is a PTP DELAY_RESPONSE packet.

15. The system of claim 14, wherein the network includes PTP-unaware network elements.

16. A method of transmitting packets between a master device (master) and a slave device (slave), the master and the slave being connected over a network which includes an intermediate remote time-stamp generator, the remote time-stamp generator being a device distinct from the master and the slave, the method comprising:
transmitting a first packet from the master to the slave so that the first packet traverses the remote time-stamp generator before reaching the slave, the first packet including an approximate time of departure of the first packet from the master;
determining, by the remote time-stamp generator, a time of departure of the first packet from the remote time-stamp generator as the first packet traverses the remote time-stamp generator en route to the slave, wherein the time of departure of the first packet is communicated by the remote time-stamp generator to the master; and
transmitting a second packet from the master to the slave, the second packet including the communicated time of departure of the first packet from the remote time-stamp generator.

17. The method of claim 16, further comprising:
transmitting a third packet from the slave to the master so that the third packet traverses the remote time-stamp generator before reaching the master;
determining, by the remote time-stamp generator, a time of arrival of the third packet as the third packet traverses the remote time-stamp generator en route to the master, wherein the time of arrival of the third packet is communicated by the remote time-stamp generator to the master; and
transmitting a fourth packet from the master to the slave, the fourth packet including the communicated time of arrival of the third packet at the remote time-stamp generator.

18. The method of claim 16,
wherein the remote time-stamp generator is positioned in the network at a location that is between the master and the slave, and
wherein a logical network distance between the remote time-stamp generator and the slave is less than a logical network distance between the master and the slave.

19. The method of claim 16, wherein a clock at the master and a clock at the remote time-stamp generator are synchronized with a Global Navigation Satellite System (GNSS) source.

20. The method of claim 17,
wherein the first packet is a Precision Time Protocol (PTP) SYNC packet,
wherein the second packet is a PTP FOLLOW-UP packet,
wherein the third packet is a PTP DELAY_REQUEST packet, and
wherein the fourth packet is a PTP DELAY_RESPONSE packet.

* * * * *